(12) United States Patent
Warner

(10) Patent No.: US 8,438,968 B2
(45) Date of Patent: May 14, 2013

(54) ROTATABLE COFFEE MAKER

(75) Inventor: Dean C. Warner, Glen Allen, VA (US)

(73) Assignee: Hamilton Beach Brands, Inc, Glen Allen, VA (US)

( * ) Notice: Subject to any disclaimer, the term of this patent is extended or adjusted under 35 U.S.C. 154(b) by 1068 days.

(21) Appl. No.: 11/369,644

(22) Filed: Mar. 7, 2006

(65) Prior Publication Data

US 2006/0213376 A1    Sep. 28, 2006

Related U.S. Application Data

(60) Provisional application No. 60/662,659, filed on Mar. 17, 2005.

(51) Int. Cl.
*A47J 31/00* (2006.01)
*A47J 31/44* (2006.01)

(52) U.S. Cl.
USPC .................................. 99/279; 99/284

(58) Field of Classification Search ............ 99/275–323, 99/483, 348; 213/306, 285, 249.8; 211/144; 108/1
See application file for complete search history.

(56) References Cited

U.S. PATENT DOCUMENTS

| | | | |
|---|---|---|---|
| 294,337 A * | 2/1884 | Seldomridge | 312/249.8 |
| 314,958 A | 3/1885 | Mendenhall | |
| 455,280 A * | 6/1891 | Emerson | 312/306 |
| 1,136,776 A | 4/1915 | Collins | |
| 3,794,952 A * | 2/1974 | Dowis | 439/21 |
| 4,191,437 A * | 3/1980 | Funke | 312/305 |
| 4,635,894 A | 1/1987 | Sammons | |
| 4,974,500 A * | 12/1990 | Boyd et al. | 99/279 |
| 5,000,082 A * | 3/1991 | Lassota | 99/304 |
| 5,309,821 A * | 5/1994 | Knepler | 99/282 |
| 5,311,812 A * | 5/1994 | Smit | 99/280 |
| 5,440,972 A | 8/1995 | English | |
| 5,644,972 A * | 7/1997 | Dahmen et al. | 99/280 |
| 5,676,040 A * | 10/1997 | Ford | 99/280 |
| 5,704,275 A * | 1/1998 | Warne | 99/281 |
| 6,135,009 A * | 10/2000 | Lassota | 99/290 |
| 6,240,830 B1* | 6/2001 | Goldston | 99/279 |
| 6,253,763 B1* | 7/2001 | Pounders, Jr. | 128/201.11 |
| 6,410,068 B2* | 6/2002 | Goldston | 426/433 |
| 6,470,793 B1* | 10/2002 | Vogt | 99/279 |
| 6,668,704 B1* | 12/2003 | Lassota | 99/306 |
| 6,760,953 B2 | 7/2004 | Ben-Meir | |
| 2002/0189050 A1 | 12/2002 | Ben-Meir | |
| 2004/0055913 A1 | 3/2004 | Berry | |

* cited by examiner

*Primary Examiner* — Henry Yuen
*Assistant Examiner* — Hemant Mathew
(74) *Attorney, Agent, or Firm* — Alexander D. Raring

(57) ABSTRACT

A coffeemaker includes a bottom of a coffeemaker adapted to be placed onto and supported by a surface. Three or more wheel assemblies are mounted onto the bottom of the coffeemaker. The wheel assemblies rotate in substantially a straight line. The wheel assemblies are mounted on an imaginary circle on the bottom of the coffeemaker, and the straight line of rotation of each of the wheels is substantially tangent to the imaginary circle.

1 Claim, 5 Drawing Sheets

ROTATABLE COFFEE MAKER

This application claims the benefit of U.S. Provisional Patent Application No. 60/662,659, filed Mar. 17, 2005.

The present invention is directed to coffee makers. Specifically, the invention relates to a coffee maker having a base that allows the coffee maker to be rotated.

BACKGROUND

Coffee makers have become common kitchen appliances for almost every home. Users commonly place a coffee maker on a countertop. Prior to using a typical coffee maker, a user pours fresh water into the top of the coffee maker and adds fresh coffee grinds and a filter into a filter basket. Overhanging cabinets above the counters can interfere with a user's ability to pour water into the top of the coffee maker and add the coffee grinds. Although it is generally simple to lift and move a coffee maker, this is still an inconvenience. There is a need for a coffee maker having easy access to multiple sides and different areas of the top of the coffee maker without requiring the coffee maker to be slid or translated with respect to the counter on which it sits.

In addition, many other types of appliances have been and are being developed that also compete for kitchen counter top space. It can be frustrating for a user of a coffee maker, for instance, an automatic drip coffee maker, to find sufficient room for handling the coffee maker on a counter top when it must be filled with fresh water or new coffee grinds are added. There is often a need to access both the back and front of the coffee maker assembly. These actions can be difficult if there is insufficient counter top work space. Accordingly, there is a need for a coffee maker having easy access to its top and multiple sides without requiring extra kitchen counter top space.

SUMMARY

Accordingly, it is an object of the present invention to overcome the foregoing deficiencies and inconvenience of existing coffee makers. The present invention includes a coffee maker adapted to rotate around in place with a circular motion. The base of the coffee maker includes oriented wheels so that a user can merely rotate the coffee maker in place to access portions of the top of the coffee maker, both the front or back or any side of the coffee maker.

In one example, a coffee maker includes a bottom of the coffee maker adapted to be placed onto and supported by a surface. Three or more wheel assemblies are mounted onto the bottom of the coffee maker. The wheel assemblies include wheels that rotate in substantially a straight line. Further, the wheel assemblies are mounted on an imaginary circle on the bottom of the coffee maker, and the straight line of rotation of each of the wheels is substantially tangent to the imaginary circle. The wheel assemblies may be mounted substantially symmetrically spaced apart on the imaginary circle. There may be four wheel assemblies, and the wheels of those wheel assemblies may be comprised of rubber.

DETAILED DESCRIPTION

The present invention is directed to coffee makers having a rotating base allowing the entire device to rotate in place to give a coffee maker user access to the top or to multiple sides of the coffee maker. A coffee maker is described in terms of various embodiments shown herein. Of course, the present invention is not limited to these specific embodiments but also includes other variations known to those of skill in the art.

Figure 1:
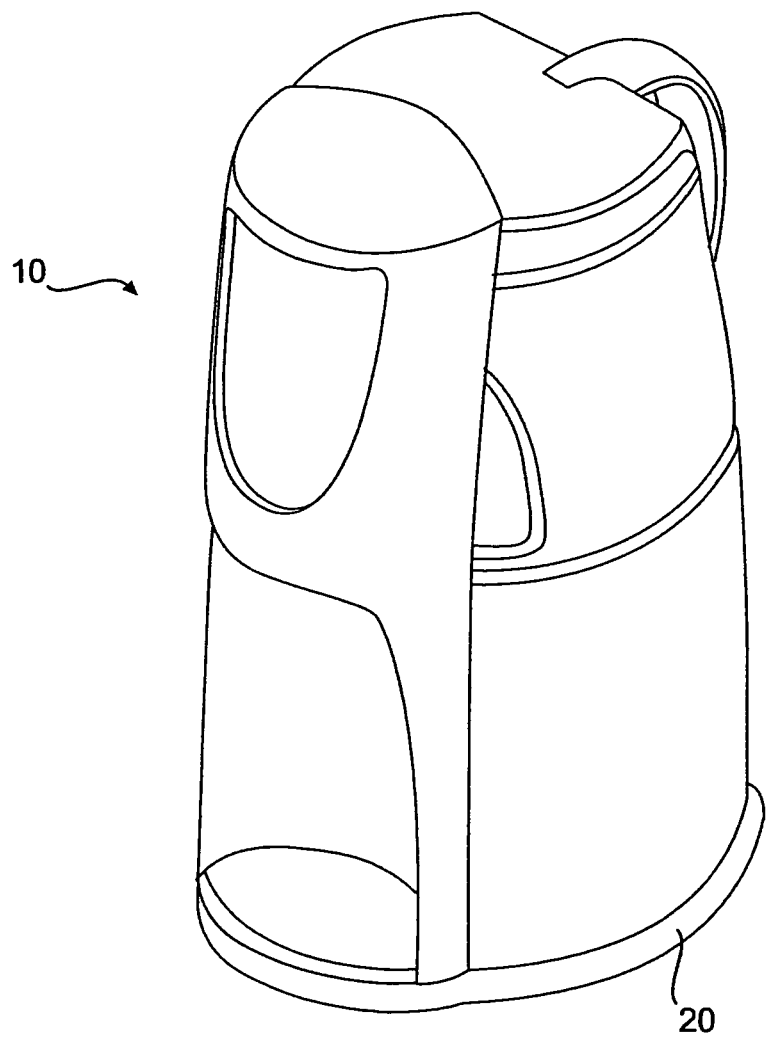
FIG. 1 is a perspective view of a coffee maker having a rotatable base as described herein.
Figure 2:
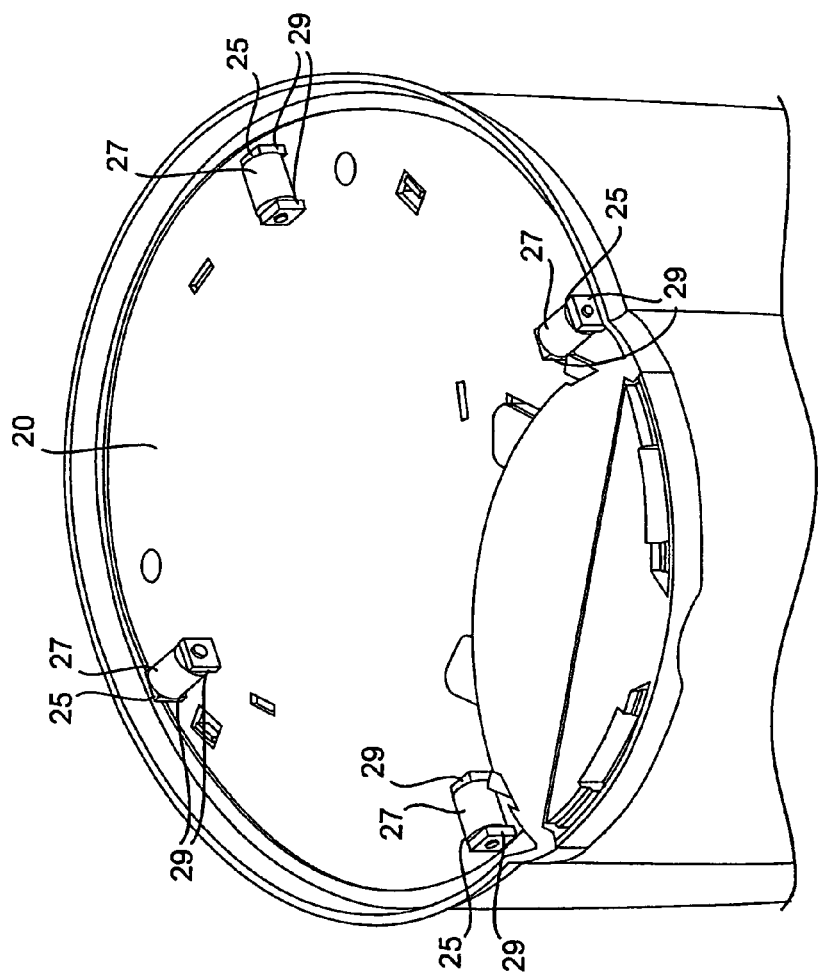
FIG. 2 is a perspective view of the bottom of a coffee maker having a rotatable base.
Figure 3:
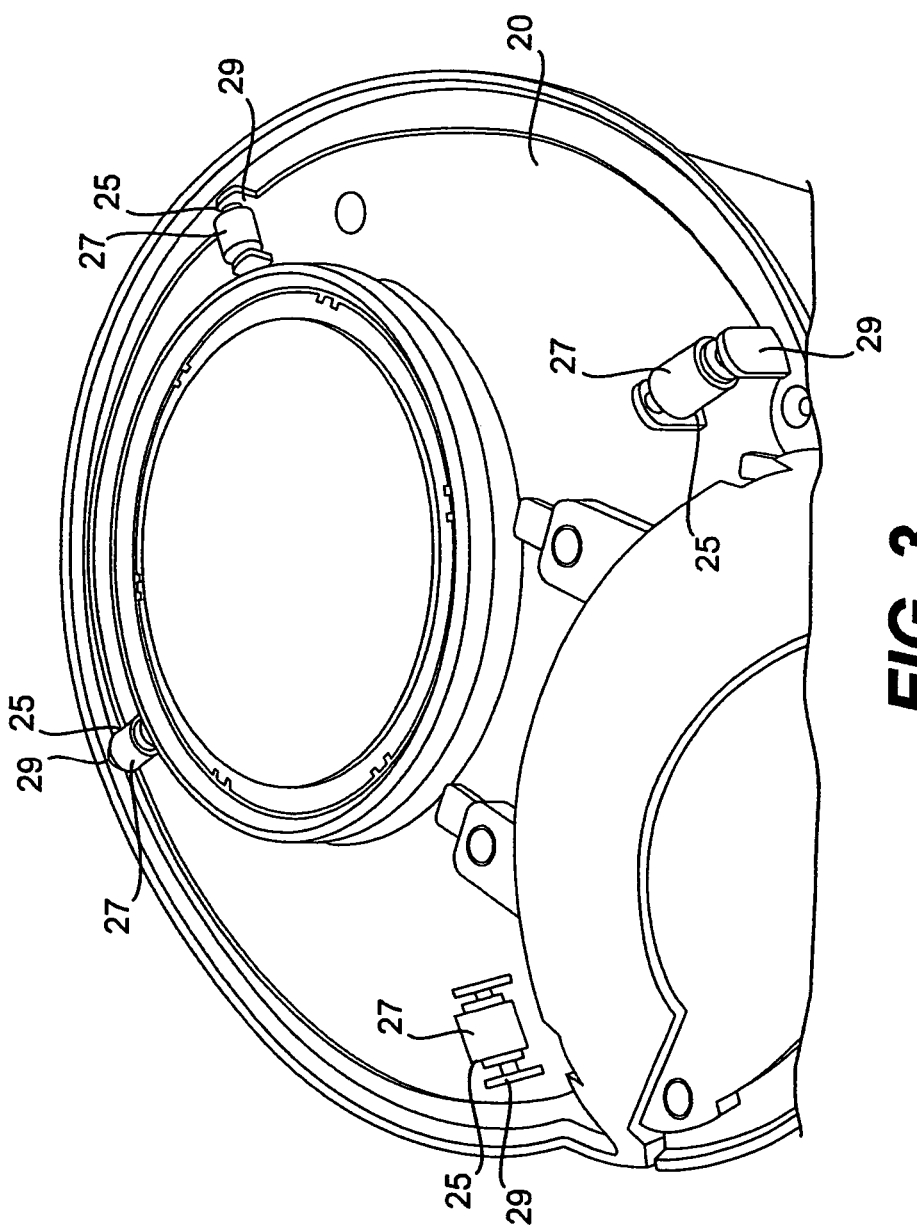
FIG. 3 is a perspective view of the bottom of a coffee maker having a rotatable base as described herein.

Turning now to the drawings, FIG. 1 illustrates an example of a coffee maker 10 having a base 20 that is rotatable. The rotatable base 20 allows the user to access portions of the top of the coffee maker and all sides of the coffee maker 10 while leaving the coffee maker in the single position where it has been placed. For instance, a user may rotate the coffee maker 10 to a side in order to remove or insert the removable fresh water reservoir/carafe into the coffee maker. The assembly can then be rotated around so that the front is accessible to a user desiring to dispense coffee from the assembly. Other functions related to use of the coffee maker that may be facilitated by varying degrees and orientation of rotation include cleaning of the assembly, removal of spent coffee grinds and adding or loading new grinds, adding fresh water to a fixed reservoir, or any other purpose.

Figure 4:
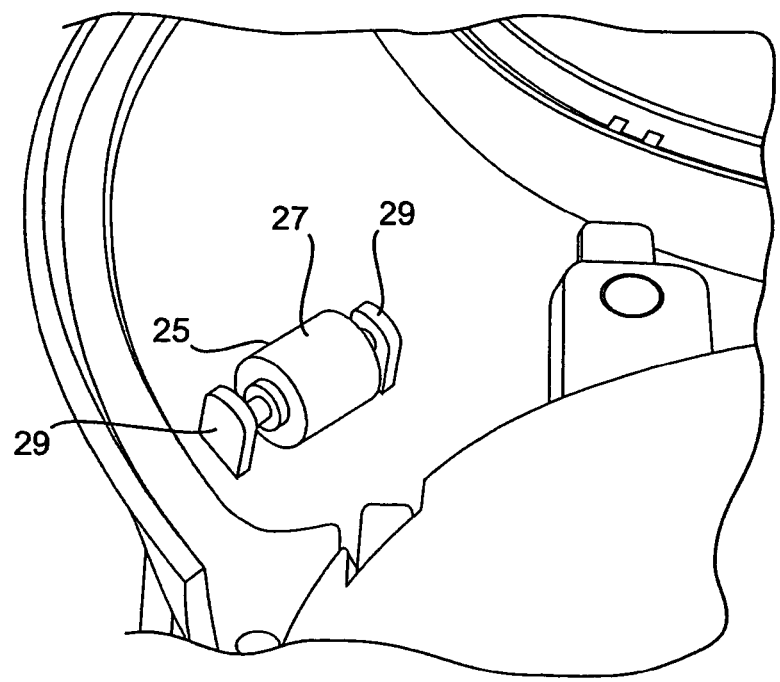
FIGS. 4-6 are perspective views of a wheel mounted on the base of a coffee maker to enable rotation of the coffee maker.
Figure 5:
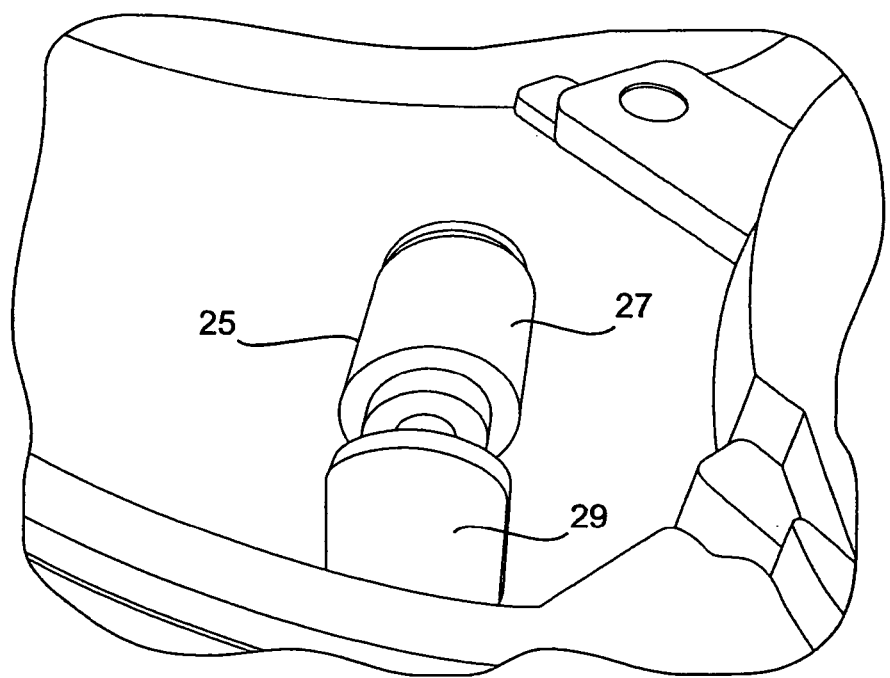
Figure 6:
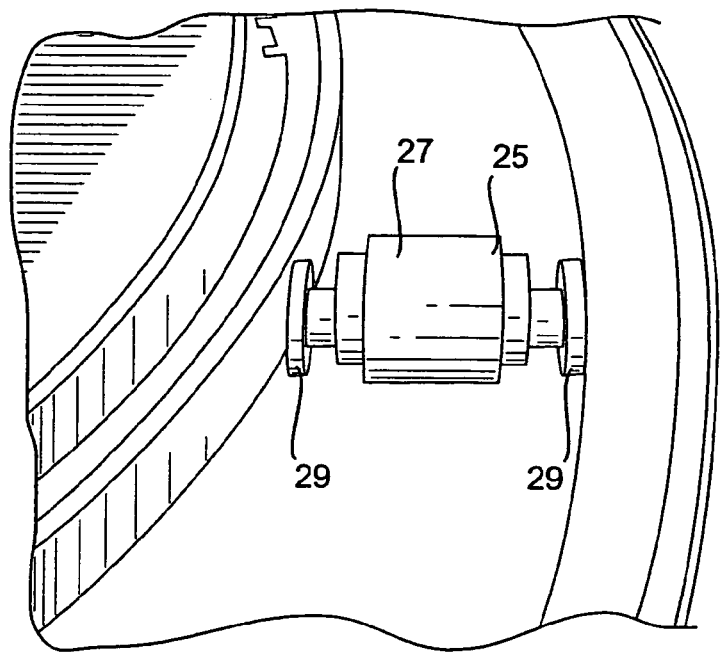

Turning now to FIGS. 2 through 6, the bottom 20 of the coffee maker 10 has four wheel assemblies 25 mounted onto it. The wheel assemblies 25 are made up of rubber wheels 27 mounted on brackets 29. The rubber wheels 27 are cylindrical in shape, so they move in one line or roll in one direction only. The wheel assemblies 25 are mounted approximately 90° apart from each other. However, wheel assemblies 25 could be mounted other than in the symmetric configuration shown. Also, there could be as few as three and up to five or more wheel assemblies fixed on the bottom 20. The rubber wheels 27 are fabricated of a durable and soft rubber that will not slide easily on a surface. Therefore, the rubber wheels 27 may roll about their cylindrical axis in a free manner. However, there is little or no lateral movement as a result of the rubber friction contact of the wheels with a flat surface such as a counter top when in use. Also, the wheel assemblies 25 are mounted so that they are not in alignment. The respective opposite pairs of wheel assemblies 25 are parallel, as shown, however the four wheels in combination prevent the bottom from moving in any direction but a circular direction. The wheel assemblies 25 are made from a durable and heavy enough plastic or metal material so that the rubber wheels 27 will be allowed to freely rotate on the brackets 29. FIGS. 4-6 show detailed views of the wheel assembly 25 including the rubber wheel 27 and the supporting brackets 29. These views clearly illustrate the construction that the cylindrical rubber wheels 27 will roll freely in a substantially straight line only. This prevents the coffee maker from moving in any direction but in a circular fashion.

Figure 7:
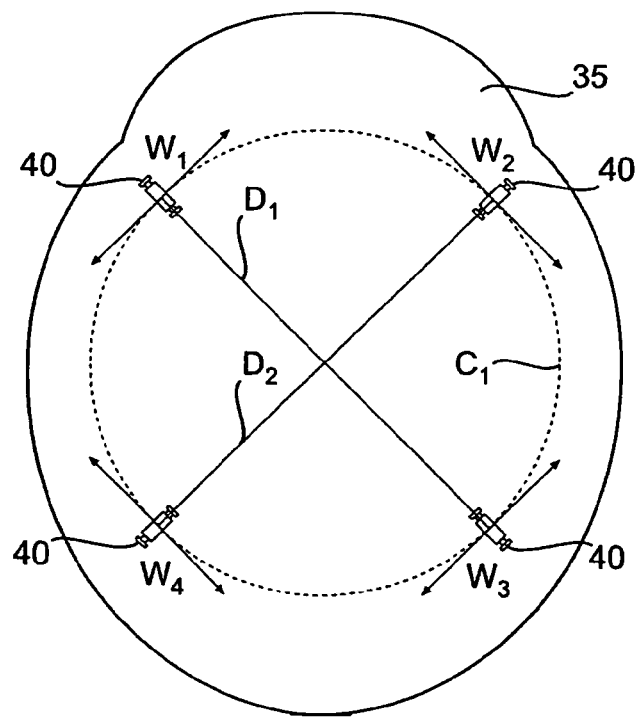
FIG. 7 is a schematic illustrating the geometry of an embodiment of the present invention.

FIG. 7 is a schematic view that illustrates the geometry of a multiple wheel system that enables circular rotation. A bottom 35 of a coffee maker is shown having four wheels 40. Those wheels 40 are able to move in only one direction as shown by the arrows $W_1$, $W_2$, $W_3$ and $W_4$. The wheels 40 may be cylindrical in shape as shown previously in FIGS. 4-6, or they may be otherwise castored or fixed to move in a single direction or straight line only. Those straight lines $W_{1-4}$ are tangent to an imaginary circle $C_1$ shown in broken lines. Each of the wheels 40 must be mounted along the same imaginary circle $C_1$ in order to allow the free circular rotation. Another way of describing the geometry of the direction of each of the wheels 40 is to note that the direction of lines $W_{1-4}$ is each perpendicular to a diameter, for instance $D_1$ or $D_2$ of the imaginary circle $C_1$ that passes through the same point that the wheels 40 are in connection with the bottom 35. As explained earlier, this means that the coffee maker base may move in only a circular direction.

The geometry of the present invention does not require the specific positioning of four equidistant wheels 40 as shown in FIG. 7. For instance, the four wheels could be spaced around on the imaginary circle $C_1$ in a asymmetric fashion as long as the direction of movement of each of the wheels is as described herein. Also, three or five or more wheels could be mounted on the base on an imaginary circle in a fashion that the rotation and movement of the wheels is in a direction tangent to the circle or perpendicular to the diameter that passes through that point of connection. Additionally, there is no limitation with respect to the size or diameter of the circle that the wheels may be mounted onto. It may be desirable to have a relatively large circle to make a coffee maker more stable by having a wider footprint. However, the geometry and selection of the wheels is only limited by the fact that the wheels must be mounted on a common imaginary circle and be rotatable only in a direction tangent to the point of the circle on which the wheels are mounted.

The coffee makers described herein may rotate freely in a complete 360° circle as shown, for instance, in FIGS. 1-7. Alternatively, however, the range of rotation may be less than 360°. In one embodiment, the wheel assemblies 25 may be spring-loaded to limit the distance of rotation and thereby limit the range of rotation. Even a partial range of rotation may allow a user effective access to various sections or portions of a coffee maker. These limitations in a range of rotation may be predetermined or fixed into an assembly to be specially related to or adapted for a particular coffee maker.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A coffee maker comprising: a bottom of the coffee maker adapted to be placed onto and be supported by a surface; three or more wheel assemblies mounted onto the bottom of the coffee maker; wherein the wheel assemblies are mounted on an imaginary circle on the bottom of the coffee maker and the wheel assemblies are fixed such that an axis of rotation of each wheel assembly is substantially perpendicular to the imaginary circle such that the coffee maker may move in only a circular direction; further comprising rotation limiters, wherein the range of rotation of the coffee maker is less than 360°.

* * * * *